Aug. 11, 1953     J. W. McGARRY     2,648,349
VALVE STRUCTURE
Filed Dec. 10, 1947     2 Sheets—Sheet 1
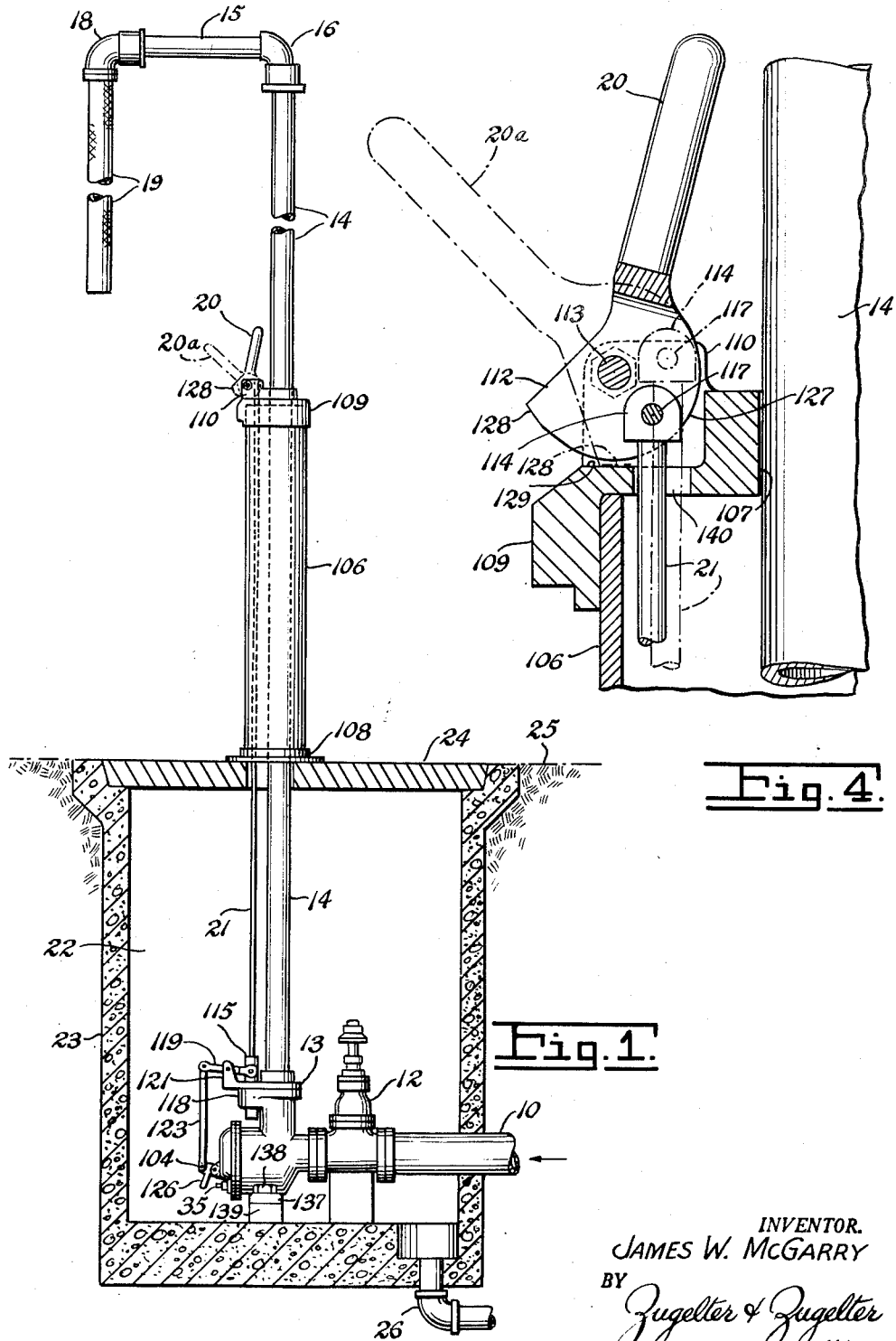
INVENTOR.
JAMES W. McGARRY
BY
Zugelter & Zugelter
Attys.

Aug. 11, 1953  J. W. McGARRY  2,648,349
VALVE STRUCTURE
Filed Dec. 10, 1947  2 Sheets-Sheet 2
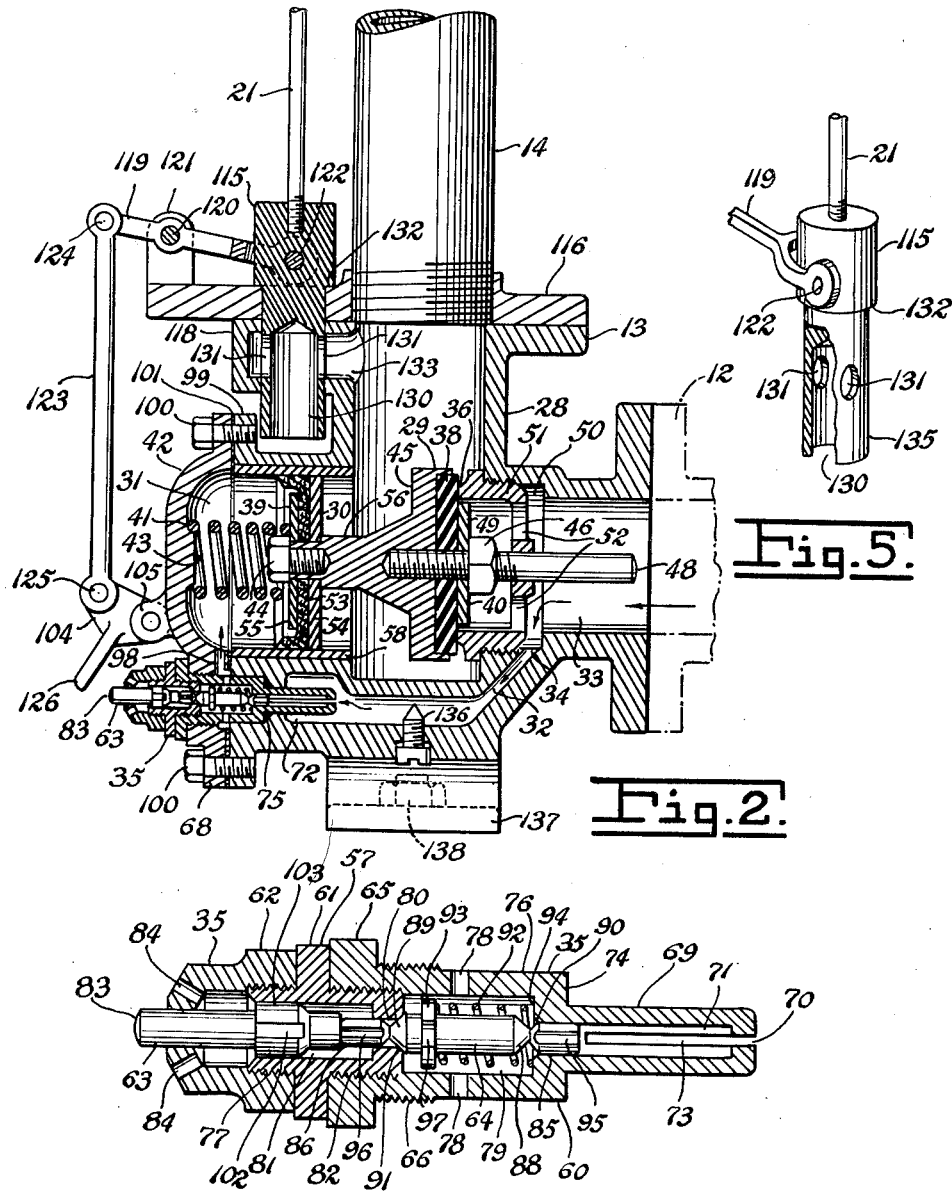
INVENTOR.
JAMES W. MCGARRY
BY Zugelter & Zugelter
Attys.

Patented Aug. 11, 1953

2,648,349

UNITED STATES PATENT OFFICE 2,648,349

VALVE STRUCTURE

James W. McGarry, Cincinnati, Ohio

Application December 10, 1947, Serial No. 790,777

1 Claim. (Cl. 137—620)

This invention relates to a valve structure and more particularly to means for controlling the flow of water through a water column or other water service fixture.

An object of the invention is to provide a quick opening and closing valve structure, which is free of water hammer, and adapted especially for use in connection with railroad water columns and other water service fixtures which deliver at a rapid rate.

Another object is to provide a valve structure of the class referred to wherein water under pressure selectively opens and closes the valve through the medium of an auxiliary or pilot valve.

A further object is to provide a non-freezing, self-draining valve structure for use in connection with a railroad water column or other water service fixture.

Another object is to provide a water service fixture of improved construction, which may be operated by one attendant, and kept in proper operating condition with a minimum amount of servicing or repairs.

Another object is to provide a water service fixture especially adapted for use in supplying water to diesel locomotives at intervals along the railroad right-of-way.

These and other objects and advantages are attained by the means described herein and illustrated upon the accompanying drawings, in which:

Fig. 1 is an elevational view of a water column and its associated valves, said valves being disposed in a pit which is shown in cross section.

Fig. 2 is a cross sectional view of the main valve.

Fig. 3 is an enlarged cross-sectional view of the pilot valve which forms part of the invention.

Fig. 4 is an enlarged cross-sectional view of the valve operating handle.

Fig. 5 is a perspective view, partly in cross section, showing the construction of the drain plunger, which forms part of the invention.

With the substitution or addition of diesel locomotives to railroad operations, it has become necessary to supply new and different types and kinds of equipment for servicing the locomotives at the terminals and waypoints, in order to conserve time and labor. By way of example, it has been found not feasible to water the diesel locomotive from the steam locomotive water column, and the use of ordinary yard hydrant equipment has not proven satisfactory for the purpose due to various limitations of accessibility, delivery rate, and inconvenience of use. The development of the water service device herein disclosed, has solved all existing problems incident to the watering of diesel locomotives under various climatic conditions, with the requisite savings of time and labor necessary to maintaining fast operating schedules. The new device is described as follows.

Referring to Fig. 1, a fresh water supply line 10 has connection with a suitable shut-off valve 12, which is preferably a gate valve, said gate valve being connected with the water column control main valve 13. Extending upwardly from the main valve 13 is the vertical riser 14, which may be of any desired height, topped by a substantially horizontal pipe 15 connected to swivel joints 16 and 18, the latter of which may be provided with a depending flexible hose 19 or other suitable means for discharging water into a diesel locomotive or the like.

The gate valve 12 is normally in open position, the flow of water through the riser 14 being controlled by means of the main valve operating handle 20, which has connection with the main valve 13 through the operating rod 21. As shown in Fig. 1, the gate valve 12 and the main valve 13 are disposed in a pit 22, below the frost line, in order to preclude freezing of the system during cold weather, the walls of the pit being indicated at 23. A cover plate 24, substantially flush with the ground surface 25, may be provided for preventing the entry of dirt, cinders, and other extraneous matter into the pit. A drain 26, having direct connection with a sewer or other waste disposal means, may be provided for draining waste water from the pit.

The main vave 13, shown in detail in Fig. 2, comprises a body or casing 28, interiorly provided with a reciprocable valve disc 29, a piston 30 coaxially fixed to the valve 29 and shiftable therewith, and a pressure chamber 31. Water under pressure is normally directed to the pressure chamber 31 through the cored passage or channel 32 which is in communication with the inlet port 33, as indicated at 34, the water under pressure passing through the normally open inserted pilot valve 35, as indicated by the arrows. The pilot valve 35 shall hereinafter be considered to be open when water under pressure is permitted to flow through it from the inlet port 33.

It will be noted that the area of the piston 30 is substantially greater than the area of that part of the valve washer 38 which is scribed by the annular seat 36 when the main valve is closed. Pressure of water in the chamber 31 exerted against the inner face 39 of the piston 30, serves to force said piston to the right, as viewed in the drawing. This movement is translated to the valve disc 29, to seat the washer 38 upon the annular valve seat 36. A counter-force of lesser value is exerted by water pressure in chamber 33 against the washers 38 and 49, tending to open the valve in opposition to the greater effective force of water against piston 30. Thus, with equality of pressure within the chambers 31 and 33, the valve will remain closed. The closing force may be augmented by a compression spring 41, if desired. Such spring may be maintained in axial alignment with the piston by means of the boss 43, provided interiorly of the pressure chamber cover 42, and the head of the piston screw 44.

It is obvious, therefore, that as long as water under pressure is maintained in the pressure chamber 31, the valve washer 38 will be held upon the seat 36, thereby to preclude water entering the riser 14. Closing the pilot valve 35, which is remotely controlled by means of the operating handle 20 (Figs. 1 and 4), as will be explained later, will cause pressure of the water in the chamber 31 to be relieved, and the water contained therein will drain out. As soon as this occurs, the pressure of water against the valve disc face 40 will cause the valve to become unseated, thereby to discharge water through the vertical riser 14.

As will be noted in Fig. 2, the inlet port 33 and the pressure chamber 31 are in axial alignment with the valve disc 29 and the piston 30. The valve washer 38, which may be of leather, rubber, composition, or any other suitable material common to the art, is mounted upon the face, of the holder 45 and held against displacement by means of the nut 46 threaded upon the valve guide 48, which in turn is threaded into the holder 45 co-axially therewith. A suitable washer 49 may be interposed between the nut 46 and the washer 38. The inner enlarged diameter 50 of the main valve inlet port 33 is threaded to receive the valve seat spider 51, which is centrally apertured to receive the valve guide 48 in sliding relation therewith. Water under pressure which unseats the valve 29 upon closing of the pilot valve 35, passes through the openings 52 provided in the spider 51. It will be noted that the annular outer face of the spider member 51 carries the valve seat 36.

The piston 30 comprises a fitted cup 53 of leather or the like, interposed between a pair of washers 54 and 55 mounted upon the shouldered shank 56 of the holder 45, the mounting means comprising the piston screw 44, the head of which enters one end of the piston compression spring 41. The periphery of cup 53, of course, snugly fits the wall of the pressure chamber 31, in substantial leak-proof relation therewith. A sleeve of wear-resistant properties may be pressed into the compression chamber 31 to form a liner, as shown at 58.

The pilot valve 35, shown in detail in Fig. 3, comprises a body 60, a guide bushing 61, and a weep nut 62, all in threaded connection and in axial alignment and having contained therein for longitudinal reciprocal movement the valve stem 63 and the double-coned valve plug 64.

The pilot valve body 60, provided with a hex head 65, is exteriorly threaded, as at 66, for connection with the main valve 13 as shown in Fig. 2, cooperating threads being provided for this purpose in the depending flange 68 of the pressure chamber cover 42. The elongate reduced diameter extension 69 of the pilot valve body 60 is longitudinally bored, as at 70, and counterbored, as at 71, and extends into the enlarged inner terminus 72, Fig. 2, of the passage or channel 32 provided in the main valve body 28. The reduced end 69 of the pilot valve body 60 may be provided with one or more longitudinal slots 73 to permit an ample flow of water under pressure through the pilot valve. The shoulder 74 of the pilot valve body 60 abuts a suitable packing ring or gasket 75, Fig. 2, for establishing leak-proof connection with the main valve 13. The enlarged portion 76 of the pilot valve body is provided with a series of transverse ports 78 communicating with the valve chamber 79 of the valve body.

The exteriorly threaded guide bushing 61, which is provided with a hexagonal flange 57 substantially midway between its ends, is axially bored and counterbored, as at 80 and 81, respectively. The bored end of the guide bushing 61 is threaded into the interiorly threaded bore 82 of the pilot valve body.

The weep nut 62, which is similar in structure to an acorn nut, is threaded to the outer or counterbored end of the threaded guide bushing 61 as at 77, and is axially apertured for slidably supporting the pilot valve stem 63, the outer end 63 of which extends through said nut. The nut 62 is further provided with a plurality of weep holes 84, the function of which will be disclosed later.

The valve plug 64 is axially supported for reciprocal movement in the valve chamber 79 by means of opposed integral pilots 85 and 86, which are slidable in the valve body counterbore 71 and the guide bushing bore 80 respectively. Opposed cones or tapers 88 and 89 are provided on the valve plug 64, these cones being adapted to alternately seat upon the annular cooperating tapered seats 90 and 91 respectively, in closing and opening the pilot valve. Yieldable means for urging the pilot valve to the open position shown in Fig. 3, may comprise a compression spring 92 surrounding the valve plug 64, one end of said spring abutting the notched flange 93 of the valve plug and the other end abutting the inner shoulder 94 of the valve chamber 79.

It will be noted that longitudinal grooves 95 and 96 are provided on the valve plug pilots 88 and 89, respectively. These permit a flow of water into or from the valve chamber 79, depending on whether the valve is open or closed. In the open position shown in Fig. 2, water under pressure is directed to the main valve pressure chamber 31 from the channel or passage 32, through the pilot valve opening 70 and slots 73, the grooves 95 of the valve plug pilot 85, the valve chamber 79, and the pilot valve ports 78. From there, the water under pressure enters the pressure chamber 31 through the port 98 provided in the depending flange 68 of the chamber cover 42. The pressure chamber cover 42 is detachably fixed to the main valve pressure chamber flange 99 by means of screws 100, leakproof relationship being maintained by means of the gasket 101 interposed therebetween.

From the foregoing, it will be understood that as long as the pilot valve 35 is open, that is, with the valve cone 88 unseated and the valve cone 89 seated upon its complementary seat 91, water under pressure will be directed to the main valve pressure chamber 31, thereby to maintain the main valve 13 in closed position by the pressure means hereinbefore disclosed.

Force applied against the end 83 of the valve stem 63, the inner end of which abuts the face of the valve plug pilot 86, will shift the valve plug 64 to the right, as viewed in Fig. 3, to seat the valve cone 88 upon its complementary seat 90, and unseat the valve cone 89. The instant this occurs, water under pressure will be prevented from entering the pilot valve chamber 79, and the pressure in the main valve pressure chamber 31 will be released. Pressure of water in the main valve inlet port 33 will then immediately unseat the main valve disc 29 to permit entry of water into the riser 14.

When the valve cone 88 is seated upon its complementary seat 90 and the valve cone 89 is unseated, water in the pressure chamber 31 will be drained therefrom by way of the pressure chamber port 93, thence through the pilot valve ports 78, valve chamber 79, valve plug flange notches 97, groove 96 of the valve plug pilot 86, groove 102 in the valve guide sleeve 103 and finally through the weep holes 84 in the nut 62. The water thus gravitationally exhausted from the main valve pressure chamber 31 will then enter the pit drain 26, Fig. 1.

Means for depressing the pilot valve stem 63 to close the pilot valve and to maintain the said stem in depressed condition have been provided. This comprises a bellcrank 104, pivotally mounted upon a lug 105 laterally extending from the pressure chamber cover 42 of the main valve, said bellcrank being remotely controlled by means of the operating handle 20, Figs. 1 and 4, located at a convenient elevation above the pit 22.

A protective pedestal or casing 106 surrounds the lower part of the riser above the pit cover plate 24, said pedestal being suitably fixed against displacement upon the pit cover plate by means of a pipe flange 108 or the like. A hood or bonnet 109, apertured at 107 to permit the riser 14 to extend therethrough, is provided with a pair of spaced upstanding lugs 110, said lugs being transversely apertured for pivotally mounting the bifurcate cam portions 112 of the operating handle 20. The handle pivot is indicated at 113. The handle cam portions 112 are transversely apertured for pivotally mounting the head 114 of the operating rod 21, which is disposed between the handle cam portions 112, the operating rod pivot being remotely located from the handle pivot 113, as indicated at 117. An aperture 140 is provided in the hood 109 through which the operating rod 21 extends.

The operating rod at its lower end is threaded into, or otherwise fixed to, a drain plunger 115, which, as its name implies, serves as a drain as well as part of the pilot valve operating mechanism, as will presently be explained. The drain plunger, shown in detail in Fig. 5, is slidably mounted for vertical movement in aligned apertures provided in the water column flange 116 and the drainage extension 118. A forked lever 119, pivoted at 120 to the lever lug 121 provided on the flange 116, has its forked end transversely pinned to the drain plunger 115, as seen in Fig. 5, the pin being indicated at 122. A connecting rod 123 pivotally connects the lever 119 and the bellcrank 104, at 124 and 125 respectively.

Pivotal movement of the operating handle 20 away from the water column 14 will therefore result in a downward movement of the bellcrank 104. When this occurs, the depending bellcrank pad 126 will strike the pilot valve stem end 83, thereby to depress said valve stem to close the pilot valve by seating the valve cone 88 upon its complementary seat 90. It will be noted in Fig. 4, that pivotal movement of the handle 20 as described, will result in elevating the operating rod 21, as shown in broken lines. Elevating the operating rod will, of course, move the lever 119 to cause the connecting rod 123 to be lowered, which action in turn causes the bellcrank 104 to move downward on its pivot 105 to close the pilot valve.

Means may be provided for maintaining the pilot valve in closed position while water is being discharged from the water column. A flat portion 128 may be provided on the periphery of each operating handle cam 112, which, being spaced a substantially greater distance from the axis of pivot 113 than the arcuate portion 127 of the cam, is adapted to seat firmly upon the horizontal face 129 of the bonnet or hood 109 between the upstanding lugs 110, when the handle 20 is moved about its pivot 113 to the position shown at 20a in Fig. 4. With the cam flats 128 thus firmly seated upon the face 129, the pilot valve 35 will be maintained in closed condition until the operating handle is released from the position shown at 20a and returned to the position shown at 20. At this point, pressure from the bellcrank pad 126 will be removed from the pilot valve stem 63 and pressure of the pilot valve spring 92 will unseat the valve cone 88, as shown in Fig. 3. Water under pressure will then enter the main valve pressure chamber 31, as hereinbefore explained, to quickly but not instantly close the main valve 13, thereby to effectively preclude water hammer.

To avoid freezing of water standing in the riser when the main valve 13 is closed, the cylindrical drain plunger is provided with a blind longitudinal bore 130 extending upwardly substantially half the length of the plunger. Transverse apertures 131 are provided in the drain plunger 115, said apertures being in communication with the longitudinal bore 130 adjacent the upper end thereof. When the drain plunger shoulder 132 is seated upon the water column flange 116, the transverse apertures 131 will register with the chamber 133 of the drainage extension 118, as shown in Fig. 2. Since the drainage extension 118 is in direct communication with the interior of the main valve 13, above the valve disc 29, all water standing in the riser 14 will be drained therefrom when the valve disc 29 is in seated or closed position, thus precluding the possibility of freezing in sub-freezing weather. Water thus drained will spill from the plug bore 130 and be disposed of through the drain 26 provided in the bottom of the pit 22.

When the operating handle 20 is manipulated to close the pilot valve 35, the drain plunger 115 will be elevated to the extent that the plunger apertures 131 will move out of register with the drainage extension 118, thereby to preclude leakage of water from the riser to the pit drain during use of the water column.

The main valve body 28 may be provided with mounting means, such as laterally extending feet 137, apertured for the insertion therethrough of screws or bolts 138, Figs. 1 and 2, for rigidly fixing said valve to a suitable supporting block 139 or the like.

In order to regulate the speed of closing of the main valve, a needle valve 136 or its equivalent may be associated with the passage 32, as indicated. By advancing the needle valve into the passage, flow of water to chamber 31 may be reduced when necessary, to retard the speed of closing of the main valve and thereby overcome the possibility of water hammer occurring. Such regulation may become necessary as the moving parts of the apparatus become worn in service, or as changes occur in the water pressure at the source of supply. As an alternative to the provision of a regulating valve such as 136, the capacity of the pilot valve might be altered by interchangeability of valve plugs 64 having flutes of different sizes at the location 95.

The self-draining, anti-freezing water service device of the invention is subject to various modifications and changes in structural details, as will be appreciated by those skilled in the art. Such modifications and changes are to be comprehended within the scope of the appended claims, except where the claimed structure is expressly limited to the form disclosed herein, by the claim terminology.

The device is simple of construction, and is built to afford trouble-free service over a long period of time without the need for frequent repairs or adjustments. Installation is effected with a minimum of labor and other expense, using either existing pits and water mains, or new ones properly located beside the tracks. Any parts accidentally broken or disabled in service are easily and quickly replaceable, without the aid of cranes and other heavy equipment usually needed for repairing other types of water columns. Various other desirable features and advantages readily will become manifest to persons conversant with the art, as will be understood.

What is claimed is:

A pilot valve for supplying water under pressure to the cylinder of a piston operated main valve, said pilot valve comprising a cup-shaped main valve body, there being an axial inlet port in the bottom of said body and an opening in the side thereof for communicating with the cylinder, a guide bushing attached to and closing the mouth of said body, there being an outlet port in said guide bushing in alignment with the inlet port in the body, a cup-shaped discharge fitting, the mouth of said discharge fitting being attached to the guide bushing, there being a guide bore in the base of said discharge fitting aligned with the inlet and outlet ports, there being a valve seat inside each of said ports, a reciprocating plug in the body, said plug having a body portion inside said body and guide stems at opposite ends of said body portion slidably received in said ports, there being valve faces on opposite ends of the body portion of the plug adapted to alternately close said inlet and outlet ports, each guide stem being slidably received in one of the ports, the inboard end of each guide stem being of lesser diameter than the port associated therewith, there being slots in the guide stems for the passage of water through each port when open, spring means urging the plug toward the outlet port to close the outlet port, and an axial extension on the guide stem in the outlet port having an enlargement thereon engaging the inner wall of the guide bushing and being provided with a slot extending therethrough, said extension projecting through the bore in the base of the discharge fitting, there being a space inside the discharge fitting surrounding said extension and a drain hole through the wall of the discharge fitting to permit drainage of water when the outlet port is open and means for engaging said extension for opening the outlet port.

JAMES W. McGARRY.

References Cited in the file of this patent

UNITED STATES PATENTS

| Number | Name | Date |
|---|---|---|
| 29,872 | Fuller | Sept. 4, 1860 |
| 173,796 | Kenyon | Feb. 22, 1876 |
| 181,534 | Ogelsby | Aug. 29, 1876 |
| 417,633 | Dowling | Dec. 17, 1889 |
| 420,889 | Probert | Feb. 4, 1890 |
| 1,584,407 | Thomas | May 11, 1926 |
| 1,875,145 | Ralston | Aug. 30, 1932 |
| 2,064,343 | Finley | Dec. 15, 1936 |
| 2,217,712 | Steelman | Oct. 15, 1940 |
| 2,230,644 | Horta | Feb. 4, 1941 |
| 2,234,635 | Scott | Mar. 11, 1941 |
| 2,293,867 | Temple | Aug. 25, 1942 |

FOREIGN PATENTS

| Number | Country | Date |
|---|---|---|
| 738,182 | France | of 1932 |